(12) United States Patent
Koishi et al.

(10) Patent No.: US 11,565,603 B2
(45) Date of Patent: Jan. 31, 2023

(54) VEHICLE POWER SUPPLY CONTROL METHOD AND VEHICLE POWER SUPPLY CONTROL DEVICE

(71) Applicant: Nissan Motor Co., Ltd., Kanagawa (JP)

(72) Inventors: Akifumi Koishi, Kanagawa (JP); Masahiko Tahara, Kanagawa (JP); Atsushi Tezuka, Kanagawa (JP); Tomoyuki Koike, Kanagawa (JP); Munemitsu Watanabe, Kanagawa (JP); Terumasa Tsuchiya, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/476,114

(22) Filed: Sep. 15, 2021

(65) Prior Publication Data

US 2022/0001768 A1 Jan. 6, 2022

Related U.S. Application Data

(62) Division of application No. 15/765,227, filed as application No. PCT/JP2015/005043 on Oct. 2, 2015, now abandoned.

(51) Int. Cl.
| | |
|---|---|
| *B60L 58/12* | (2019.01) |
| *H02J 7/02* | (2016.01) |
| *H02J 7/14* | (2006.01) |
| *H02J 7/34* | (2006.01) |
| *H02J 7/00* | (2006.01) |

(Continued)

(52) U.S. Cl.
CPC ............. *B60L 58/12* (2019.02); *B60L 58/20* (2019.02); *B60R 16/033* (2013.01); *B60W 10/08* (2013.01); *F02N 11/0803* (2013.01); *F02N 11/087* (2013.01); *F02N 11/0866* (2013.01); *H02J 7/00* (2013.01); *H02J 7/02* (2013.01); *H02J 7/14* (2013.01); *H02J 7/1423* (2013.01); *H02J 7/34* (2013.01); *B60L 2240/12* (2013.01); *B60L 2240/547* (2013.01); *B60L 2240/549* (2013.01)

(58) Field of Classification Search
None
See application file for complete search history.

(56) References Cited

U.S. PATENT DOCUMENTS

| | | |
|---|---|---|
| 6,320,351 B1 | 11/2001 | Ng et al. |
| 2003/0062773 A1 | 4/2003 | Richter et al. |

(Continued)

FOREIGN PATENT DOCUMENTS

| | | |
|---|---|---|
| JP | 2009-280096 A | 12/2009 |
| JP | 2012-090404 A | 5/2012 |
| JP | 2014-200123 A | 10/2014 |

*Primary Examiner* — Daniel Kessie
(74) *Attorney, Agent, or Firm* — Osha Bergman Watanabe & Burton LLP

(57) ABSTRACT

A sub-battery (33) having an internal resistance lower than that of a main battery (32) is connected to a power supply circuit (31) connected to the main battery (32). In this case, the sub-battery (33) is connected to the power supply circuit (31) after the voltage $E_{CKT}$ of the power supply circuit (31) is adjusted to the voltage $E_{Sub}$ of the sub-battery (33) by controlling the power generation voltage $E_{ALT}$ of an alternator (24) connected to the power supply circuit (31).

5 Claims, 11 Drawing Sheets

(51) Int. Cl.
    *B60L 58/20*     (2019.01)
    *B60R 16/033*     (2006.01)
    *B60W 10/08*     (2006.01)
    *F02N 11/08*     (2006.01)

(56) References Cited

U.S. PATENT DOCUMENTS

| | | |
|---|---|---|
| 2011/0001352 A1 | 1/2011 | Tamura et al. |
| 2013/0229049 A1 | 9/2013 | Larsson et al. |
| 2014/0265558 A1 | 9/2014 | Katayama et al. |
| 2015/0275841 A1 | 10/2015 | Sakata et al. |
| 2016/0167534 A1 | 6/2016 | Suzuki et al. |
| 2017/0197567 A1 | 7/2017 | Iwasaki et al. |
| 2018/0290557 A1 | 10/2018 | Koishi et al. |

VEHICLE POWER SUPPLY CONTROL METHOD AND VEHICLE POWER SUPPLY CONTROL DEVICE

CROSS-REFERENCE TO RELATED APPLICATIONS

This Applications is a divisional application of U.S. patent application Ser. No. 15/765,227 filed Mar. 30, 2018, entitled "Vehicle Power Supply Control Method And Vehicle Power Supply Control Device," which is a national stage application of PCT/JP2015/005043 filed Oct. 2, 2015.

BACKGROUND

Technical Field

The present invention relates to a vehicle power supply control method and a vehicle power supply control device.

Related Art

The conventional technology disclosed in PTL 1 proposes enabling connection of an advanced battery in parallel with a lead-acid battery and controlling connection of the advanced battery to adjust the amount of charge of the advanced battery to a target amount of charge.

CITATION LIST

Patent Literature

PTL 1: JP 2012-090404 A

SUMMARY OF INVENTION

When the lead-acid battery and the advanced battery have a potential difference between them, a high current may flow upon connection of the advanced battery.

One or more embodiments of the present invention suppresses the flow of a high current when a sub-battery is connected to a power supply circuit to which a main battery is connected.

In a vehicle power supply control method according to one or more embodiments of the present invention, a sub-battery having an internal resistance lower than that of a main battery is connected to a power supply circuit connected to the main battery. In this case, the sub-battery is connected to the power supply circuit after the voltage on the side of the power supply circuit is adjusted close to that of the sub-battery by controlling the power generation voltage of an electric generator connected to the power supply circuit. The main battery is configured to be disconnectable from the power supply circuit. The main battery is disconnected from the power supply circuit first, the power generation voltage of the electric generator is then controlled to adjust this power generation voltage close to the voltage of the sub-battery, and the sub-battery is connected to the power supply circuit. With the voltage of the main battery dropped upon power consumption by an electrical equipment load connected in parallel with the main battery, the power generation voltage of the electric generator is controlled to increase and adjust the voltage of the sub-battery close to that of the main battery. The main battery is connected to the power supply circuit.

According to one or more embodiments of the present invention, since the sub-battery is connected to the power supply circuit after the voltage on the side of the power supply circuit is adjusted close to that of the sub-battery, the flow of a high current can be suppressed.

DETAILED DESCRIPTION

Embodiments of the present invention will be described below with reference to the drawings. These drawings are schematic and may be different from reality. The following embodiments exemplify devices and methods for embodying the technical idea of the present invention, which do not limit the configurations to the following specific examples. In other words, various changes can be made to the technical idea of the present invention within the technical scope defined by the scope of claims. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

<<Configurations>>

An outline of an idling stop system according to one or more embodiments of the present invention will be described first.

Idling stop (IS) means the function of automatically stopping the engine of a vehicle which has halted at an intersection, in a traffic jam, or the like and restarting this engine when the vehicle departs, and is also called no-idling or idling reduction.

Figure 1:
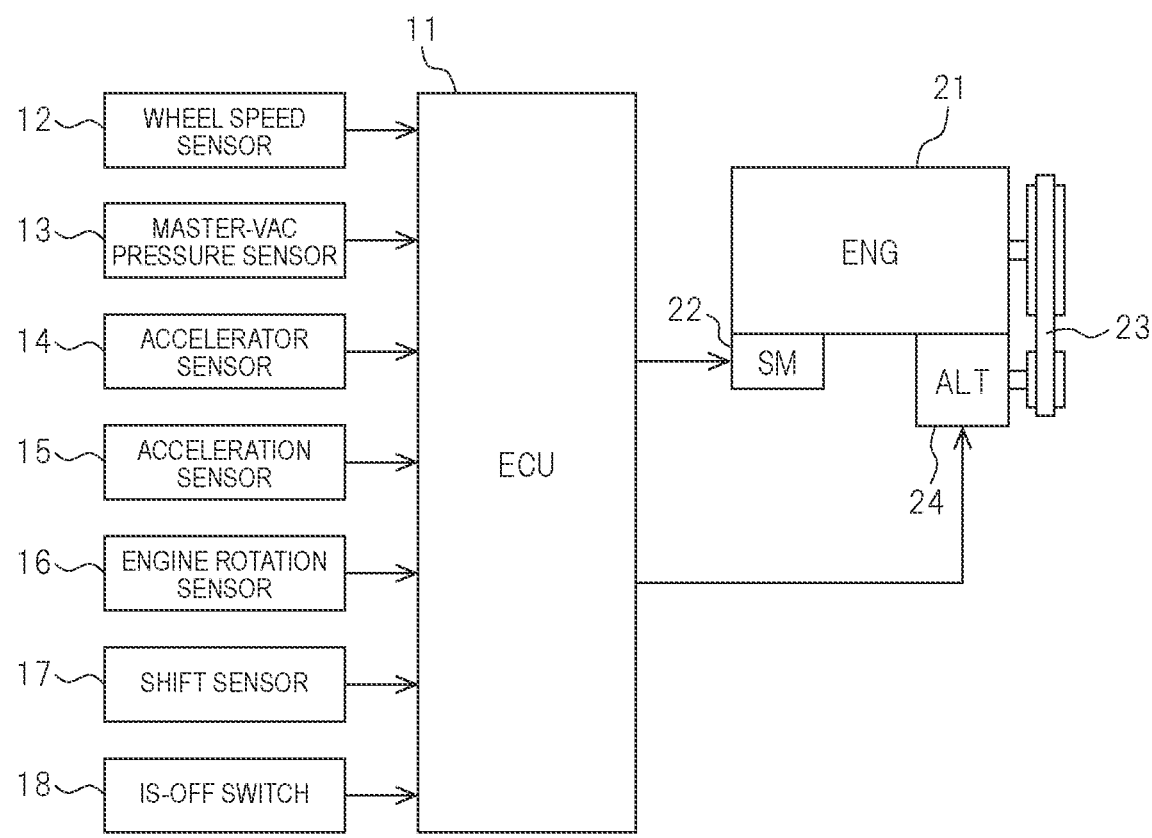
FIG. 1 is a block diagram illustrating the configuration of an idling stop system according to one or more embodiments of the present invention.

FIG. 1 is a block diagram illustrating the configuration of an idling stop system.

In the idling stop system, a controller (ECU: Electronic Control Unit) 11 performs idling stop in accordance with values detected by various sensors. Such various sensors include, for example, a wheel speed sensor 12, a Master-Vac pressure sensor 13, an accelerator sensor 14, an acceleration sensor 15, an engine rotation sensor 16, a shift sensor 17, and an idling stop OFF switch 18.

The wheel speed sensor 12 detects the wheel speeds VwFL to VwRR of respective wheels. The wheel speed sensor 12 uses a detector circuit to detect, for example, magnetic lines of force generated by a sensor rotor, converts a change in magnetic field upon rotation of the sensor rotor into a current signal, and outputs it to the controller 11. The controller 11 determines the wheel speeds VwFL to VwRR from the input current signal.

The Master-Vac pressure sensor 13 detects the pressure in a Master-Vac (brake booster) as a brake pedal tread force Pb. The Master-Vac pressure sensor 13 receives the pressure in the Master-Vac using a diaphragm unit, detects a distortion occurring in a piezoresistive element as a change in electrical resistance via the diaphragm unit, converts it into a voltage signal proportional to the pressure, and outputs it to the controller 11. The controller 11 determines the pressure in the Master-Vac, that is, the brake pedal tread force Pb from the input voltage signal.

The accelerator sensor 14 detects a pedal opening degree PPO (active position) corresponding to the amount of tread on an accelerator pedal. The accelerator sensor 14 serves as, for example, a potentiometer, converts the opening degree PPO of the accelerator pedal into a voltage signal, and outputs it to the controller 11. The controller 11 determines the opening degree PPO of the accelerator pedal from the input voltage signal. The pedal opening degree PPO is 0% when the accelerator pedal is at an inactive position and 100% when the accelerator pedal is at a maximum active position (stroke end).

The acceleration sensor 15 detects the forward and backward, acceleration and deceleration of the vehicle. The acceleration sensor 15 detects, for example, a displacement of a movable electrode relative to a fixed electrode as a change in electrostatic capacitance, converts it into a voltage signal proportional to the acceleration or deceleration and the direction, and outputs it to the controller 11. The controller 11 determines the acceleration or deceleration from the input voltage signal. The controller 11 processes the acceleration as a positive value and the deceleration as a negative value.

The engine rotation sensor 16 detects an engine rotational speed Ne. The engine rotation sensor 16 uses a detector circuit to detect, for example, magnetic lines of force generated by a sensor rotor, converts a change in magnetic field upon rotation of the sensor rotor into a current signal, and outputs it to the controller 11. The controller 11 determines the engine rotational speed Ne from the input current signal.

The shift sensor 17 detects the shift position of a transmission. The shift sensor 17 includes, for example, a plurality of hole elements and outputs respective ON/OFF signals to the controller 11. The controller 11 determines the shift position from a combination of input ON/OFF signals.

The idling stop OFF switch (IS-OFF switch) 18 detects a cancellation operation for the idling stop system. The idling stop OFF switch 18 is placed near a dashboard to allow the driver to operate it and outputs a voltage signal according to the cancellation operation to the controller 11 via, for example, a detector circuit having a normally closed contact. The controller 11 determines from the input voltage signal whether the idling stop function is to be canceled.

The controller 11 controls the stop and restart of an engine (ENG) 21 by fuel injection control via a fuel injector and ignition time control via an ignition coil. At the restart, the controller 11 further controls cranking using a starter motor (SM) 22.

The starter motor 22 is implemented as, for example, a series commutator motor and meshes the pinion gear of an output shaft with the ring gear of the engine 21 to transmit a torque to crank the engine 21. The starter motor 22 includes, for example, a solenoid which axially slides the pinion gear to extend and retract between an extension position to permit it to mesh with the ring gear of the engine 21 and a retraction position to prohibit it from meshing with this ring gear, and a gear mechanism which decelerates the rotation of a rotating shaft.

The power of the engine 21 is transmitted to an alternator (ALT) 24 via a serpentine V-belt 23. The alternator 24 generates electric power using the power transmitted via the V-belt 23, and the generated electric power is supplied to a power supply circuit (to be described later). The alternator 24 includes an internal regulator and controls the power generation voltage via the regulator.

An outline of activation of idling stop will be described below.

In the idling stop system, a standby state in which idling stop is enabled is set when, for example, the following enabling conditions are all satisfied:

An IS-OFF switch 88 is in an inactive state (the idling stop function is ON);

The state of charge (SOC) of the battery is, for example, 70% or more; and

The shift position falls outside the R range.

In the above-mentioned standby state, the engine 21 is stopped when the following activation conditions are all satisfied and 1 sec, for example, elapses:

The vehicle speed V is 0 km/h;

The opening degree PPO of the accelerator pedal is 0%;

The brake pedal tread force Pb is, for example, 0.8 MPa or more;

The road surface gradient is, for example, 14% or less; and

The engine rotational speed Ne is, for example, less than 1,200 rpm.

In this case, the average of the wheel speeds VwFL to VwRR or the like is used as the vehicle speed V. The road surface gradient is calculated in accordance with the acceleration or deceleration. The road surface gradient is given by (Vertical Distance/Horizontal Distance)×100, and 1-Hz low-pass filtering, for example, is performed.

In the above-mentioned stopped state, the engine 21 is restarted when any of the following restart conditions is satisfied:

A steering operation is started from idling stop;

The vehicle speed V is, for example, 2 km/h or more;

The opening degree PPO of the accelerator pedal is, for example, 5% or more;

A shift operation is performed from the P range to the R or D range;

A shift operation is performed from the N range to the R or D range; or

A shift operation is performed from the D range to the R range.

An outline of activation of idling stop has been described above.

The controller 11 performs voltage change control for controlling the power generation voltage of the alternator 24 in the range of, for example, 11.4 to 15.6 V. In other words, a target power generation voltage is calculated in accordance with the traveling state of the vehicle and the state of charge of the battery and controls the power generation voltage of the alternator 24 via the regulator in accordance with the calculated target power generation voltage. When, for example, the vehicle accelerates, the power generation voltage of the alternator 24 can be set lower than normal to lighten the load on the engine 21 to reduce the fuel consumption. When voltage change control is disabled, the alternator 24 performs normal power generation in accordance with the characteristics of the regulator.

The configuration of a power supply circuit will be described below.

Figure 2:
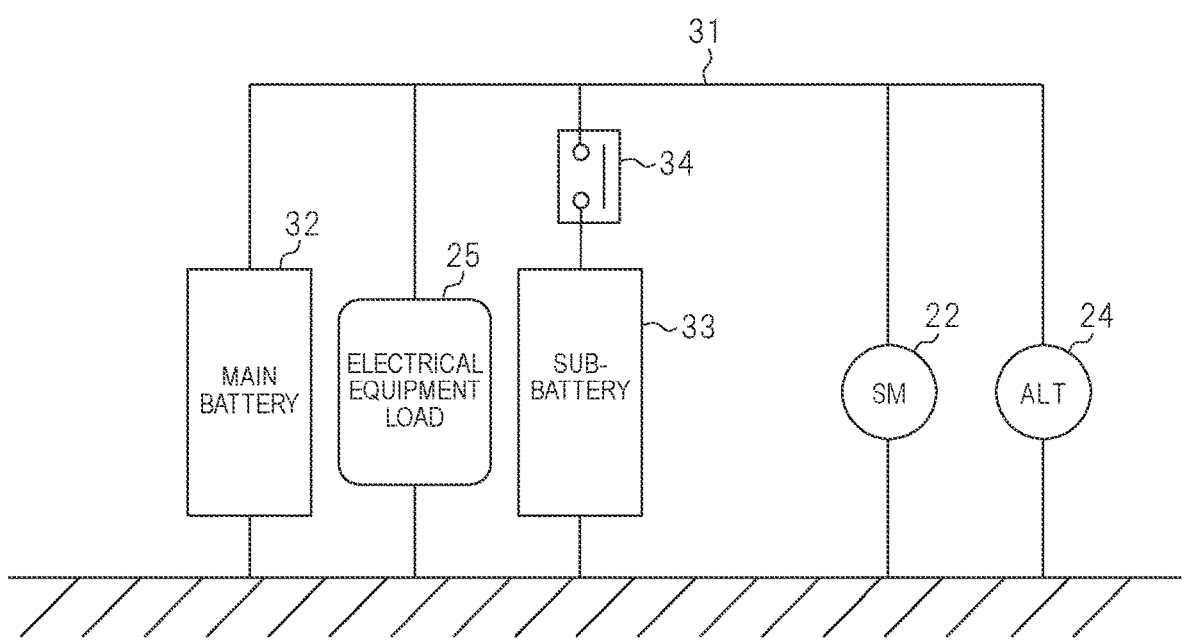
FIG. 2 is a block diagram illustrating the configuration of a power supply circuit according to one or more embodiments of the present invention.

FIG. 2 is a block diagram illustrating the configuration of a power supply circuit.

A power supply circuit 31 is implemented as a circuit which supplies power to the starter motor 22 and another electrical equipment load 25, and includes a main battery 32, a sub-battery 33, and a relay 34. The power supply circuit 31 also supplies power to the controller 11.

The main battery 32 is implemented as, for example, a lead-acid battery and uses lead dioxide for its cathode, spongy lead for its anode, and dilute sulfuric acid for its electrolyte. The main battery 32 is charged by electric power generated by the alternator 24 and has an open voltage of, for example, 12.7 V in a fully charged state.

The sub-battery 33 is provided to prevent an instantaneous drop in power supply voltage of the vehicle due to a high current flowing through the starter motor 22 at the restart of the engine 21 from idling stop. The sub-battery 33 is implemented as, for example, a lithium-ion battery that is one type of nonaqueous electrolyte secondary battery and uses a lithium metal oxide for its cathode and a carbon material such as graphite for its anode. The sub-battery 33 is charged by electric power generated by the alternator 24 and has an open voltage of, for example, 13.1 V in a fully charged state.

The lithium-ion battery has as its feature that an energy density and charge and discharge energy efficiency are higher than those of the lead-acid battery. The lithium-ion battery involves no dissolution and precipitation reactions of the electrode materials during charge and discharge and is therefore expected to have a long life. The lead-acid battery costs less than the lithium-ion battery for the same capacity, but its electrodes deteriorate upon discharge. Accordingly, the lithium-ion battery is superior to the lead-acid battery in terms of durability against repetitive charge and discharge. In addition, the lithium-ion battery has an internal resistance lower than that of the lead-acid battery and therefore has high charge and discharge performance.

The relay 34 serves as a switch to select whether the sub-battery 33 is to be connected to or disconnected from the power supply circuit 31, and is controlled by the controller 11. The relay 34 serves as a normally open a-contact, and disconnects the sub-battery 33 from the power supply circuit 31 when the contact is open, while it connects the sub-battery 33 to the power supply circuit 31 when the contact is closed. More specifically, while the engine 21 is active, the sub-battery 33 is connected to the power supply circuit 31 to charge power supplied from the alternator 24 into the sub-battery 33. At the restart of the engine 21 from idling stop, the sub-battery 33 is connected to the power supply circuit 31 to supply power to the starter motor 22. In addition, the sub-battery 33 is connected to or disconnected from the power supply circuit 31 as needed.

Connection control processing by the controller 11 will be described below.

Figure 3:
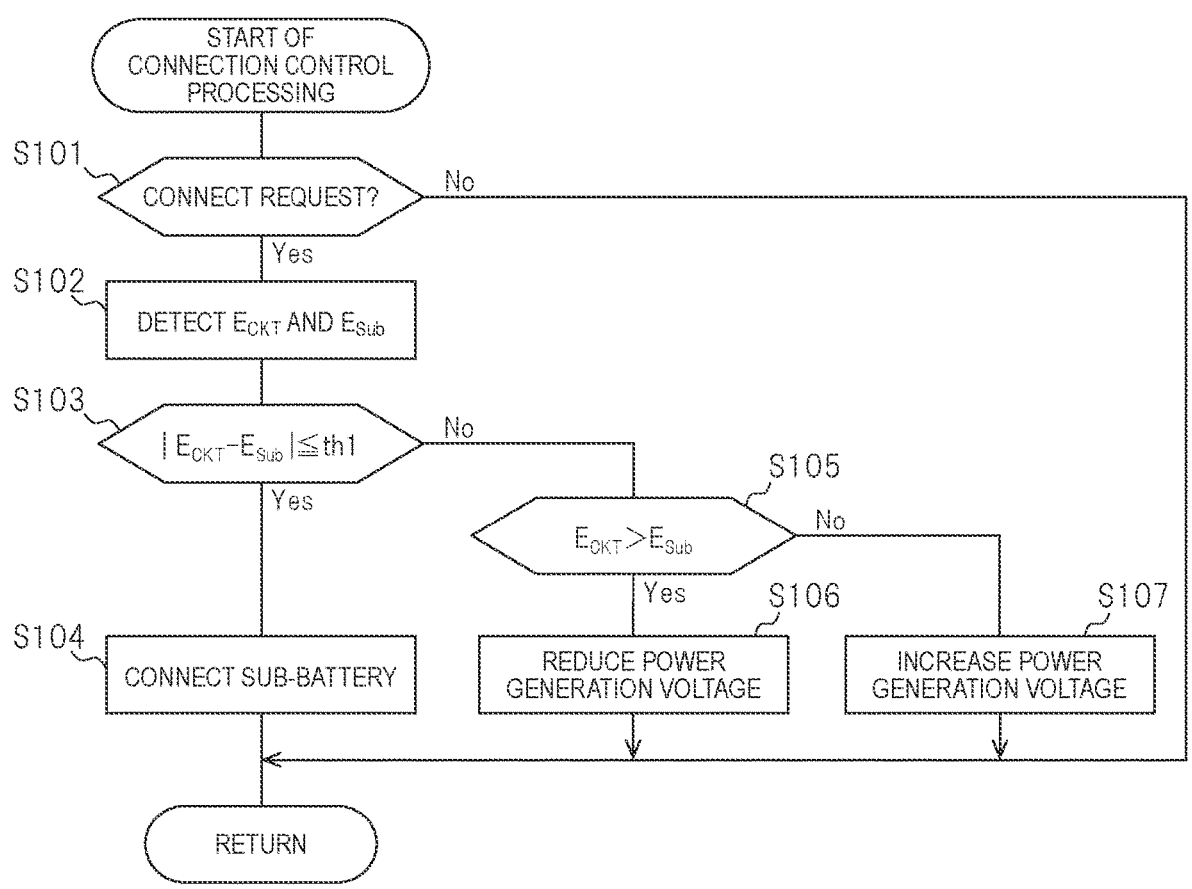
FIG. 3 is a flowchart illustrating connection control processing according to one or more embodiments of the present invention.

FIG. 3 is a flowchart illustrating connection control processing.

In step S101, it is determined whether a request to connect the sub-battery 33 to the power supply circuit 31 has been issued. If a connect request has been issued, the process proceeds to step S102. If no connect request has been issued, the process directly returns to a predetermined main program.

In step S102, the voltage $E_{CKT}$ of the power supply circuit 31 and the voltage $E_{Sub}$ of the sub-battery 33 are respectively detected via predetermined voltage detector circuits.

In step S103, it is determined whether the absolute value ($|E_{CKT}-E_{Sub}|$) of the difference between the voltages $E_{CKT}$ and $E_{Sub}$ is equal to or smaller than a predefined set value th1. If the determination result is $|E_{CKT}-E_{Sub}|\leq$th1, it is determined that the sub-battery 33 can be connected to the power supply circuit 31, and the process proceeds to step S104. If the determination result is $|E_{CKT}-E_{Sub}|>$th1, it is determined that the sub-battery 33 still cannot be connected to the power supply circuit 31, and the process proceeds to step S105.

In step S104, the relay 34 is closed to connect the sub-battery 33 to the power supply circuit 31, and the process returns to the predetermined main program.

In step S105, it is determined whether the voltage $E_{CKT}$ is higher than the voltage $E_{Sub}$. If the determination result is $E_{CKT}>E_{Sub}$, it is determined that the voltage $E_{CKT}$ of the power supply circuit 31 needs to be reduced, and the process proceeds to step S106. If the determination result is $E_{CKT}<E_{Sub}$, it is determined that the voltage $E_{CKT}$ of the power supply circuit 31 needs to be increased, and the process proceeds to step S107.

In step S106, voltage change control is performed to reduce the power generation voltage $E_{ALT}$ of the alternator 24, and the process returns to the predetermined main program.

In step S107, voltage change control is performed to increase the power generation voltage $E_{ALT}$ of the alternator 24, and the process returns to the predetermined main program.

Connection control processing has been described above.

<<Actions>>

The actions of one or more embodiments of the present invention will be described below.

A sub-battery 33 having an internal resistance lower than that of the main battery 32 and a charge and discharge performance superior to that of the main battery 32 may be connected to the power supply circuit 31 to which the main battery 32 is connected. In this case, when the main battery 32 and the sub-battery 33 have a potential difference between them, the sub-battery 33 may deteriorate when a high current flows upon connection of the sub-battery 33. Since a spark may occur at the contact of the relay 34, or heat may be generated by an inrush current for a semiconductor relay, a measure is needed to protect the switch against such a high current, thus swelling the cost.

Under the circumstances, when a request to connect the sub-battery 33 has been issued ("Yes" is determined in step S101), the voltage $E_{CKT}$ of the power supply circuit 31 is equalized with the voltage $E_{Sub}$ of the sub-battery 33, that is, the potential difference is reduced to a given tolerance, and the sub-battery 33 is then connected. In other words, when the difference ($|E_{CKT}-E_{Sub}|$) between the voltages $E_{CKT}$ and $E_{Sub}$ is equal to or smaller than the set value th1 ("Yes" is determined in step S103), the sub-battery 33 is connected to the power supply circuit 31 (step S104). When the difference ($|E_{CKT}-E_{Sub}|$) between the voltages $E_{CKT}$ and $E_{Sub}$ is larger than the set value th1 ("No" is determined in step S103), the power generation voltage $E_{ALT}$ of the alternator 24 is controlled in accordance with an inequality between these voltages.

In other words, when the voltage $E_{CKT}$ of the power supply circuit 31 is higher than the voltage $E_{Sub}$ of the sub-battery 33 ("Yes" is determined in step S105), the power generation voltage $E_{ALT}$ of the alternator 24 is reduced (step S106). In this manner, reducing the power generation voltage $E_{ALT}$, in turn, can reduce and bring the voltage $E_{CKT}$ of the power supply circuit 31 close to the voltage $E_{Sub}$ of the sub-battery 33. When the difference ($|E_{CKT}-E_{Sub}|$) between the voltages $E_{CKT}$ and $E_{Sub}$ becomes equal to or smaller than the set value th1 ("Yes" is determined in step S103), the sub-battery 33 is connected to the power supply circuit 31 (step S104).

Figure 4:
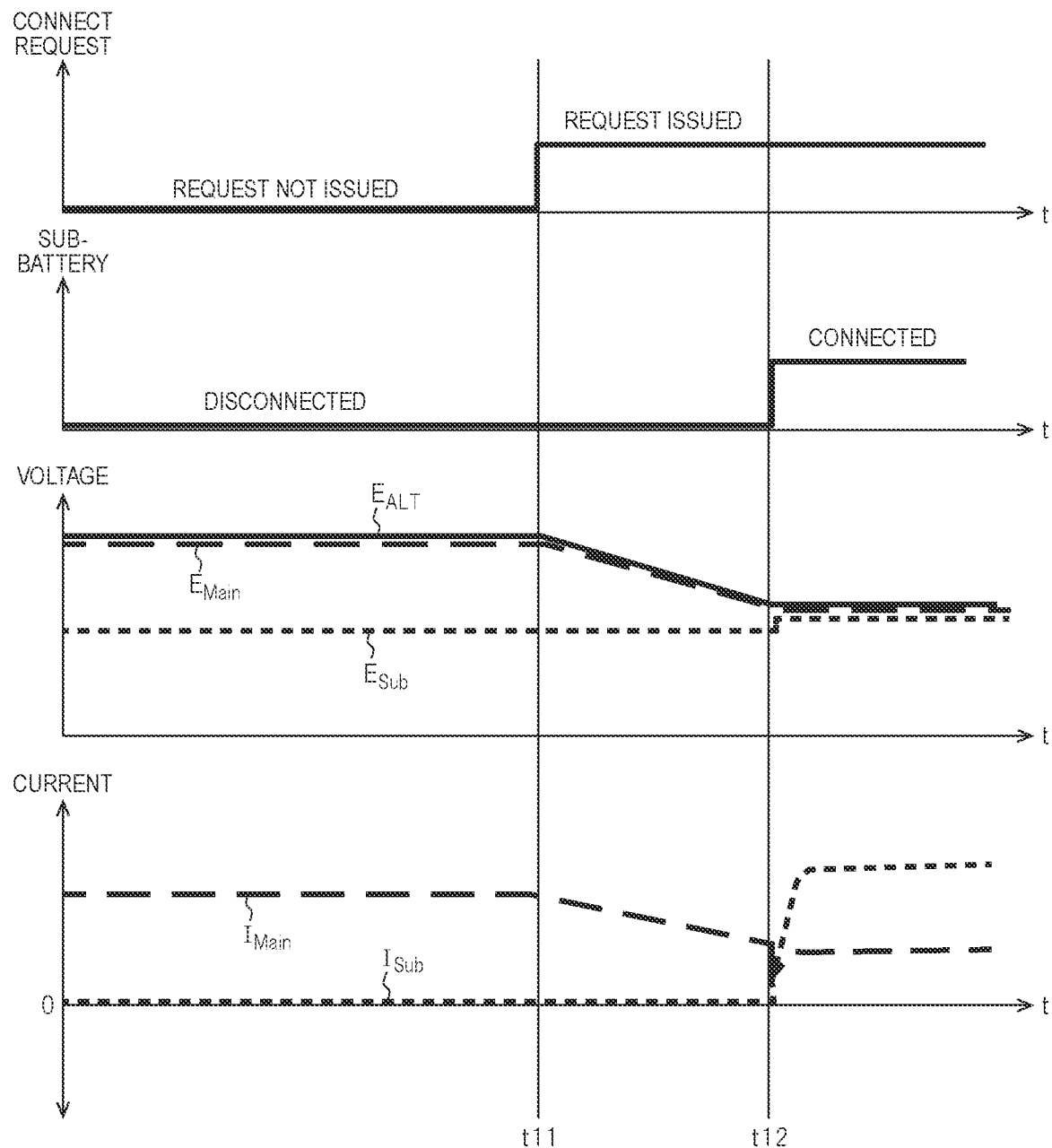
FIG. 4 is a timing chart illustrating operation example 1-1.

FIG. 4 is a timing chart illustrating operation example 1-1.

FIG. 4 represents the presence or absence of a connect request and the connection or disconnection state, the voltage, and the current of the sub-battery 33 on the time axis. For the voltage, the power generation voltage $E_{ALT}$ of the alternator 24 is indicated by a solid line, the voltage $E_{Main}$ of the main battery 32 is indicated by a broken line, and the voltage $E_{Sub}$ of the sub-battery 33 is indicated by a dotted line. For the current, the current $I_{Main}$ of the main battery 32 is indicated by a broken line and the current $I_{Sub}$ of the sub-battery 33 is indicated by a dotted line. The voltage $E_{Main}$ of the main battery 32 is nearly equal to the voltage $E_{CKT}$ of the power supply circuit 31.

At time instant t11, a request to connect the sub-battery 33 is issued. At this time, the voltage $E_{Main}$ of the main battery 32 is higher than the voltage $E_{Sub}$ of the sub-battery 33 and their potential difference is larger than the set value th1. Hence, the power generation voltage $E_{ALT}$ of the alternator 24 is reduced to, in turn, reduce and bring the voltage $E_{Main}$ ($\approx E_{CKT}$) of the main battery 32 close to the voltage $E_{Sub}$ of the sub-battery 33.

At time instant t12, the potential difference between the main battery 32 and the sub-battery 33 becomes equal to or smaller than the set value th1. Hence, the sub-battery 33 is connected to the power supply circuit 31 via the relay 34. In this case, since the current $I_{Sub}$ of the sub-battery 33 does not rapidly increase, the flow of an abrupt high current through the main battery 32, the sub-battery 33, and the relay 34 can be suppressed. An abrupt change in current $I_{Main}$ of the main battery 32 can also be suppressed.

When the voltage $E_{CKT}$ of the power supply circuit 31 is lower than the voltage $E_{Sub}$ of the sub-battery 33 ("No" is determined in step S105), the power generation voltage $E_{ALT}$ of the alternator 24 is increased (step S107). In this manner, increasing the power generation voltage $E_{ALT}$, in turn, can increase and bring the voltage $E_{CKT}$ of the power supply circuit 31 close to the voltage $E_{Sub}$ of the sub-battery 33. When the difference ($|E_{CKT}-E_{Sub}|$) between the voltages $E_{CKT}$ and $E_{Sub}$ becomes equal to or smaller than the set value th1 ("Yes" is determined in step S103), the sub-battery 33 is connected to the power supply circuit 31 (step S104).

Figure 5:
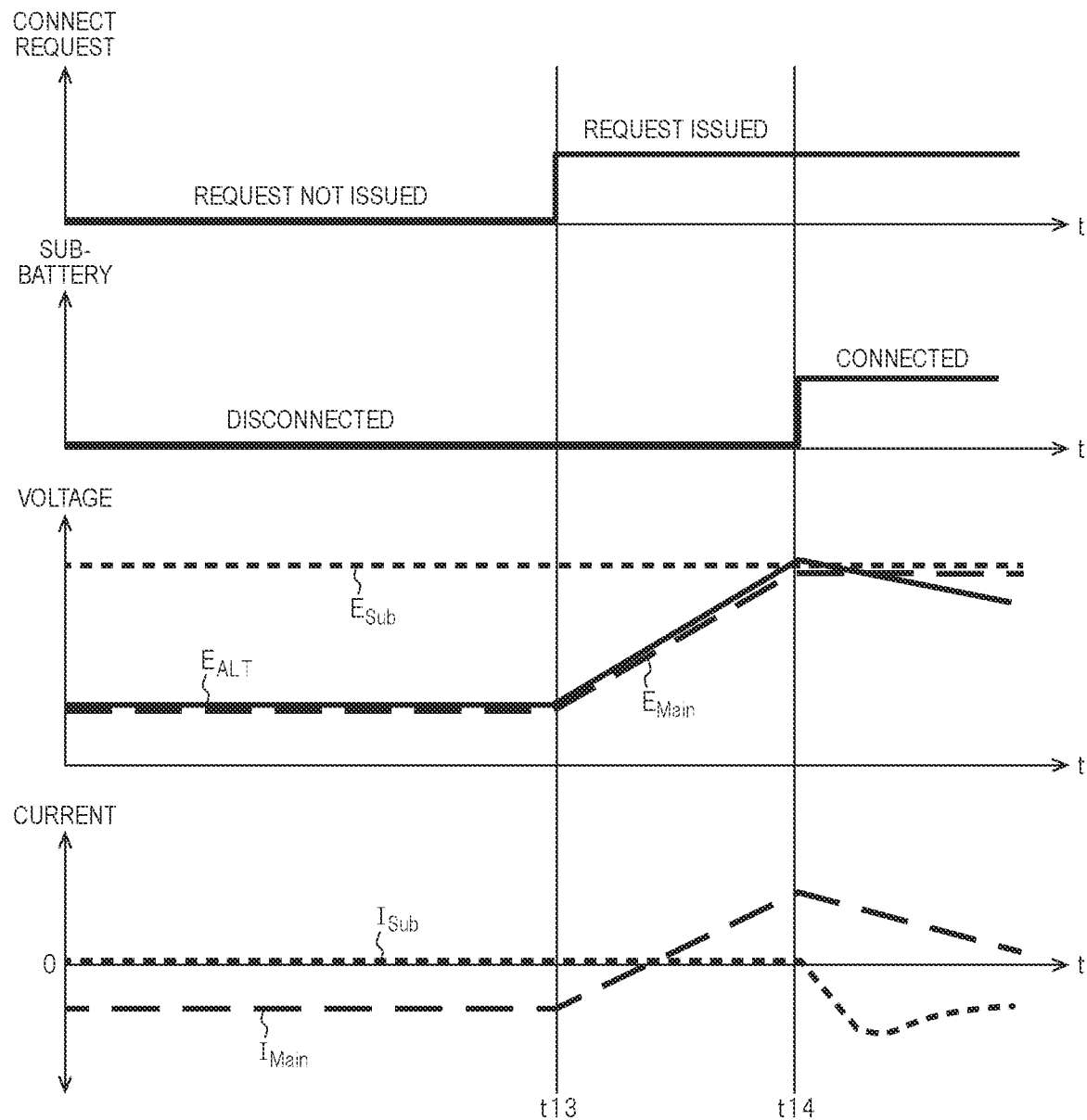
FIG. 5 is a timing chart illustrating operation example 1-2.

FIG. 5 is a timing chart illustrating operation example 1-2.

FIG. 5 represents the presence or absence of a connect request and the connection or disconnection state, the voltage, and the current of the sub-battery 33 on the time axis. For the voltage, the power generation voltage $E_{ALT}$ of the alternator 24 is indicated by a solid line, the voltage $E_{Main}$ of the main battery 32 is indicated by a broken line, and the voltage $E_{Sub}$ of the sub-battery 33 is indicated by a dotted line. For the current, the current $I_{Main}$ of the main battery 32 is indicated by a broken line and the current $I_{Sub}$ of the sub-battery 33 is indicated by a dotted line. The voltage $E_{Main}$ of the main battery 32 is nearly equal to the voltage $E_{CKT}$ of the power supply circuit 31.

At time instant t13, a request to connect the sub-battery 33 is issued. At this time, the voltage $E_{Main}$ of the main battery 32 is lower than the voltage $E_{Sub}$ of the sub-battery 33 and their potential difference is larger than the set value th1. Hence, the power generation voltage $E_{ALT}$ of the alternator 24 is increased to, in turn, increase and bring the voltage $E_{Main}$ ($\approx E_{CKT}$) of the main battery 32 close to the voltage $E_{Sub}$ of the sub-battery 33.

At time instant t14, the potential difference between the main battery 32 and the sub-battery 33 becomes equal to or smaller than the set value th1. Hence, the sub-battery 33 is connected to the power supply circuit 31 via the relay 34. In this case, since the current $I_{Main}$ of the main battery 32 does not rapidly increase, the flow of an abrupt high current through the main battery 32 can be suppressed. An abrupt change in current $I_{sub}$ of the sub-battery 33 can also be suppressed.

As described above, since the sub-battery 33 is connected after the voltage $E_{CKT}$ of the power supply circuit 31 is equalized with the voltage $E_{Sub}$ of the sub-battery 33, that is, the potential difference is reduced to a given tolerance, the flow of an abrupt high current can be suppressed. This can inhibit deterioration of the sub-battery 33 and the relay 34. Furthermore, the performance requirement for protection against a high current can be moderated, thus establishing a low-cost system. In addition, since an instantaneous abrupt change in voltage $E_{CKT}$ of the power supply circuit 31 can be suppressed, trouble such as transient dimming of, for example, a meter or a lamp or an audio interruption can be avoided.

The use of the relay 34 to select whether the sub-battery 33 is to be connected to or disconnected from the power supply circuit 31 allows easy, reliable switching between connection and disconnection of the sub-battery 33.

Comparative examples will also be given herein.

Figure 6:
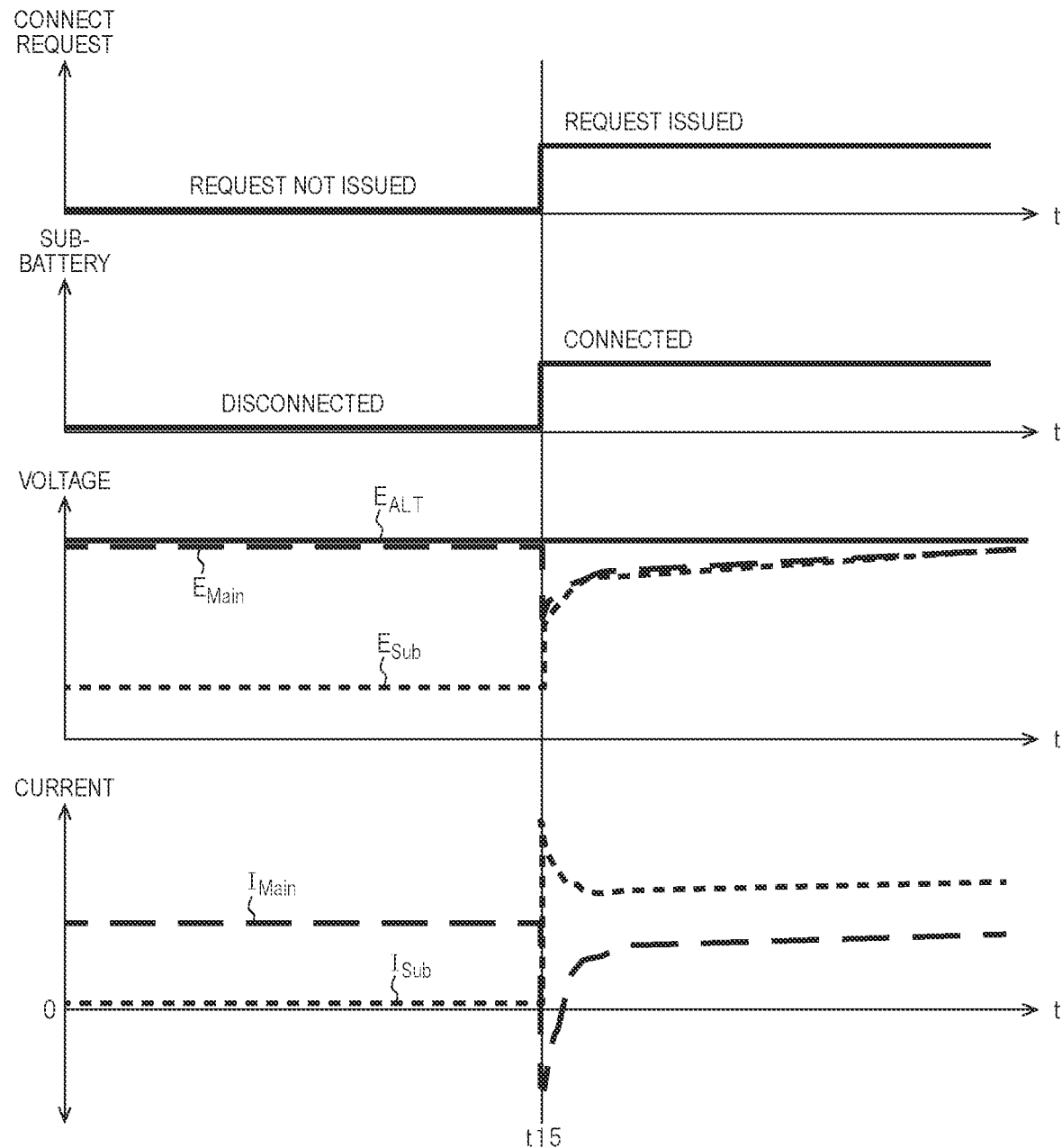
FIG. 6 is a timing chart illustrating comparative example 1-1.

FIG. 6 is a timing chart illustrating a comparative example 1-1.

At time instant t15, a request to connect the sub-battery 33 is issued. At this time, the voltage $E_{Main}$ of the main battery 32 is higher than the voltage $E_{Sub}$ of the sub-battery 33 and their potential difference is larger than the set value th1. In this state, when the sub-battery 33 is connected to the power supply circuit 31 via the relay 34, since the current $I_{Sub}$ of the sub-battery 33 rapidly increases, an abrupt high current flows through the main battery 32, the sub-battery 33, and the relay 34. This deteriorates the sub-battery 33 and the relay 34.

Figure 7:
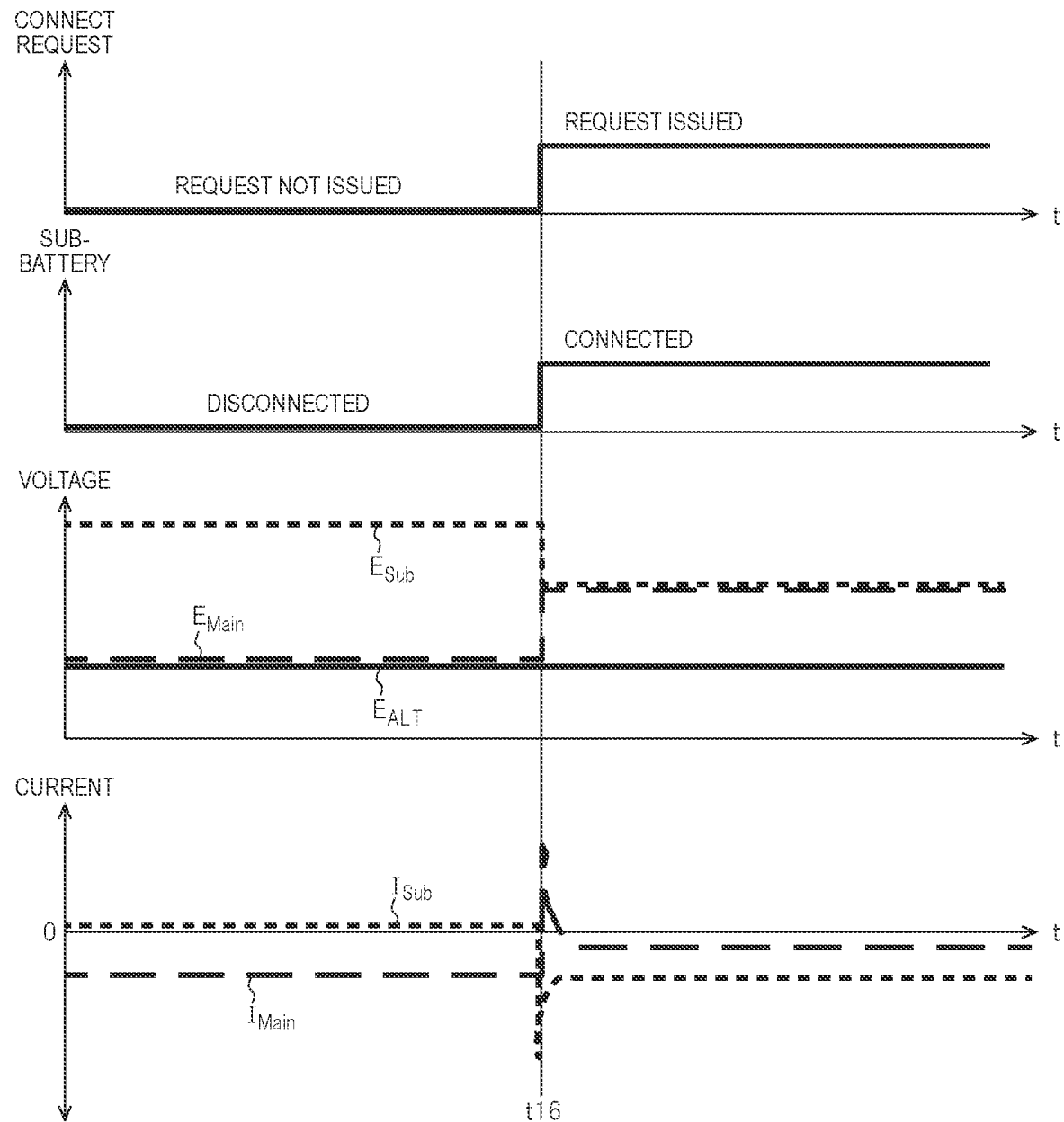
FIG. 7 is a timing chart illustrating comparative example 1-2.

FIG. 7 is a timing chart illustrating a comparative example 1-2.

At time instant t16, a request to connect the sub-battery 33 is issued. At this time, the voltage $E_{main}$ of the main battery 32 is lower than the voltage $E_{Sub}$ of the sub-battery 33 and their potential difference is larger than the set value th1. In this state, when the sub-battery 33 is connected to the power supply circuit 31 via the relay 34, since the current $I_{Main}$ of the main battery 32 rapidly increases, an abrupt high current flows through the main battery 32, the sub-battery 33, and the relay 34. This deteriorates the main battery 32 and the power supply circuit 31.

<<Correspondences>>

The main battery 32 corresponds to a "main battery." The sub-battery 33 corresponds to a "sub-battery." The relay 34 corresponds to a "switch for the sub-battery." The alternator 24 corresponds to an "electric generator." The processes in steps S101 to S107 correspond to a "connection control unit."

One or more effects that may be achieved by to one or more embodiments of the present invention will be described below.

(1) In a vehicle power supply control method according to one or more embodiments of the present invention, a sub-battery 33 having an internal resistance lower than that of the main battery 32 is connected to the power supply circuit 31 to which the main battery 32 is connected. In this case, the sub-battery 33 is connected to the power supply circuit 31 after the voltage $E_{CKT}$ of the power supply circuit 31 is adjusted to the voltage $E_{Sub}$ of the sub-battery 33 by controlling the power generation voltage $E_{ALT}$ of the alternator 24 connected to the power supply circuit 31.

In this manner, since the sub-battery 33 is connected to the power supply circuit 31 after the voltage $E_{CKT}$ of the power supply circuit 31 is adjusted to the voltage $E_{Sub}$ of the sub-battery 33, the flow of a high current can be suppressed.

(2) In the vehicle power supply control method according to one or more embodiments of the present invention, the voltage $E_{CKT}$ of the power supply circuit 31 is adjusted to the voltage $E_{Sub}$ of the sub-battery 33 by controlling the power generation voltage $E_{ALT}$ of the alternator 24.

In this manner, the voltage $E_{CKT}$ of the power supply circuit 31 can be easily adjusted to the voltage $E_{Sub}$ of the sub-battery 33.

(3) In the vehicle power supply control method according to one or more embodiments of the present invention, the relay 34 is used to select whether the sub-battery 33 is to be connected to or disconnected from the power supply circuit 31.

In this manner, the relay 34 can be used to easily, reliably switch between connection and disconnection of the sub-battery 33.

(4) A vehicle power supply control device according to one or more embodiments of the present invention includes a main battery 32 connected to the power supply circuit 31, a sub-battery 33 having an internal resistance lower than that of the main battery 32, and an alternator 24 which is connected to the power supply circuit 31 and has a controllable power generation voltage $E_{ALT}$. The sub-battery 33 is connected to the power supply circuit 31 after the voltage $E_{CKT}$ of the power supply circuit 31 is adjusted to the voltage $E_{Sub}$ of the sub-battery 33 by controlling the power generation voltage $E_{ALT}$ of the alternator 24.

In this manner, since the sub-battery 33 is connected to the power supply circuit 31 after the voltage $E_{CKT}$ of the power supply circuit 31 is adjusted to the voltage $E_{Sub}$ of the sub-battery 33, the flow of a high current can be suppressed.

<<Configurations>>

In one or more embodiments of the present invention, a main battery 32 can be disconnected from a power supply circuit 31.

Figure 8:
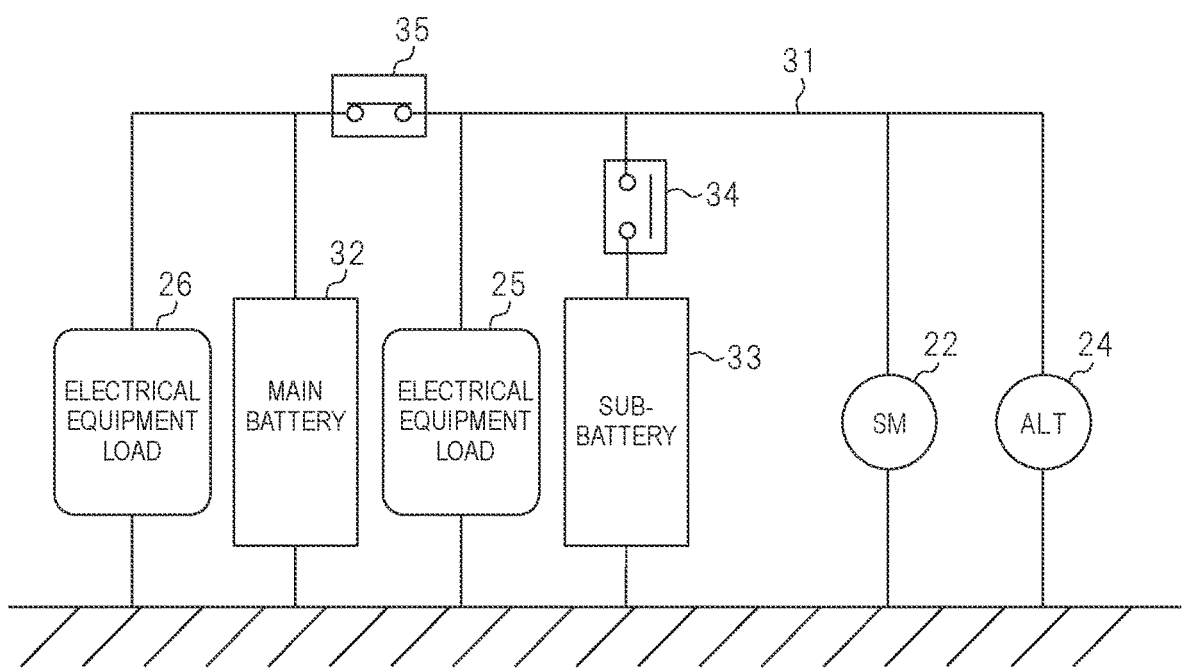
FIG. 8 is a block diagram illustrating the configuration of a power supply circuit according to one or more embodiments of the present invention.

FIG. 8 is a block diagram illustrating the configuration of a power supply circuit according to one or more embodiments of the present invention.

The power supply circuit 31 is implemented as a circuit which supplies power to a starter motor 22 and electrical equipment loads 25 and 26, and includes the main battery 32, a sub-battery 33, and relays 34 and 35.

Since one or more of the below embodiments is similar to one or more of the above-described embodiments, except that the electrical equipment load 26 and the relay 35 are newly added, a detailed description of common parts will not be given herein.

The main battery 32 is connected in parallel with the electrical equipment load 26.

The relay 35 serves as a switch to select whether the main battery 32 and the electrical equipment load 26 are to be connected to or disconnected from the power supply circuit 31, and is controlled by a controller 11. The relay 35 serves as a normally closed b-contact, and connects the main battery 32 and the electrical equipment load 26 to the power supply circuit 31 when the contact is closed, while it disconnects the main battery 32 and the electrical equipment load 26 from the power supply circuit 31 when the contact is open. Since the main battery 32 is connected in parallel with the electrical equipment load 26, power can be supplied from the main battery 32 to the electrical equipment load 26 even when the main battery 32 and the electrical equipment load 26 are disconnected from the power supply circuit 31.

The electrical equipment load 25 forms an electrical equipment system whose performance is not hampered even when the power supply voltage of the vehicle instantaneously drops due to a high current flowing through the starter motor 22 at the restart of an engine 21 from idling stop. Examples may include a wiper, a headlight, and an air bag. The electrical equipment load 26 forms an electrical equipment system whose performance is hampered when the power supply voltage of the vehicle instantaneously drops due to a high current flowing through the starter motor 22 at the restart of the engine 21 from idling stop. Examples may include a navigation system and an audio. In this manner, a circuit configuration is determined by classifying electrical equipment loads of the vehicle into those whose performances are hampered and not hampered when the power supply voltage of the vehicle instantaneously drops at the restart of the engine 21 from idling stop.

Basically, regardless of whether the engine 21 is inactive or active, the main battery 32 is connected to the power supply circuit 31. While the engine 21 is inactive, when the engine 21 is started in accordance with a driver's start operation such as a driver's key or button operation, power is supplied by the main battery 32 in the form of a lead-acid battery. While the engine 21 is active, power supplied from an alternator 24 is charged into the main battery 32. At the restart of the engine 21 from idling stop, the main battery 32 is disconnected from the power supply circuit 31, and the sub-battery 33 is then connected to the power supply circuit 31 to supply power to the starter motor 22. In addition, the sub-battery 33 is connected to or disconnected from the power supply circuit 31 as needed.

Connection control processing will be described below.

Figure 9:
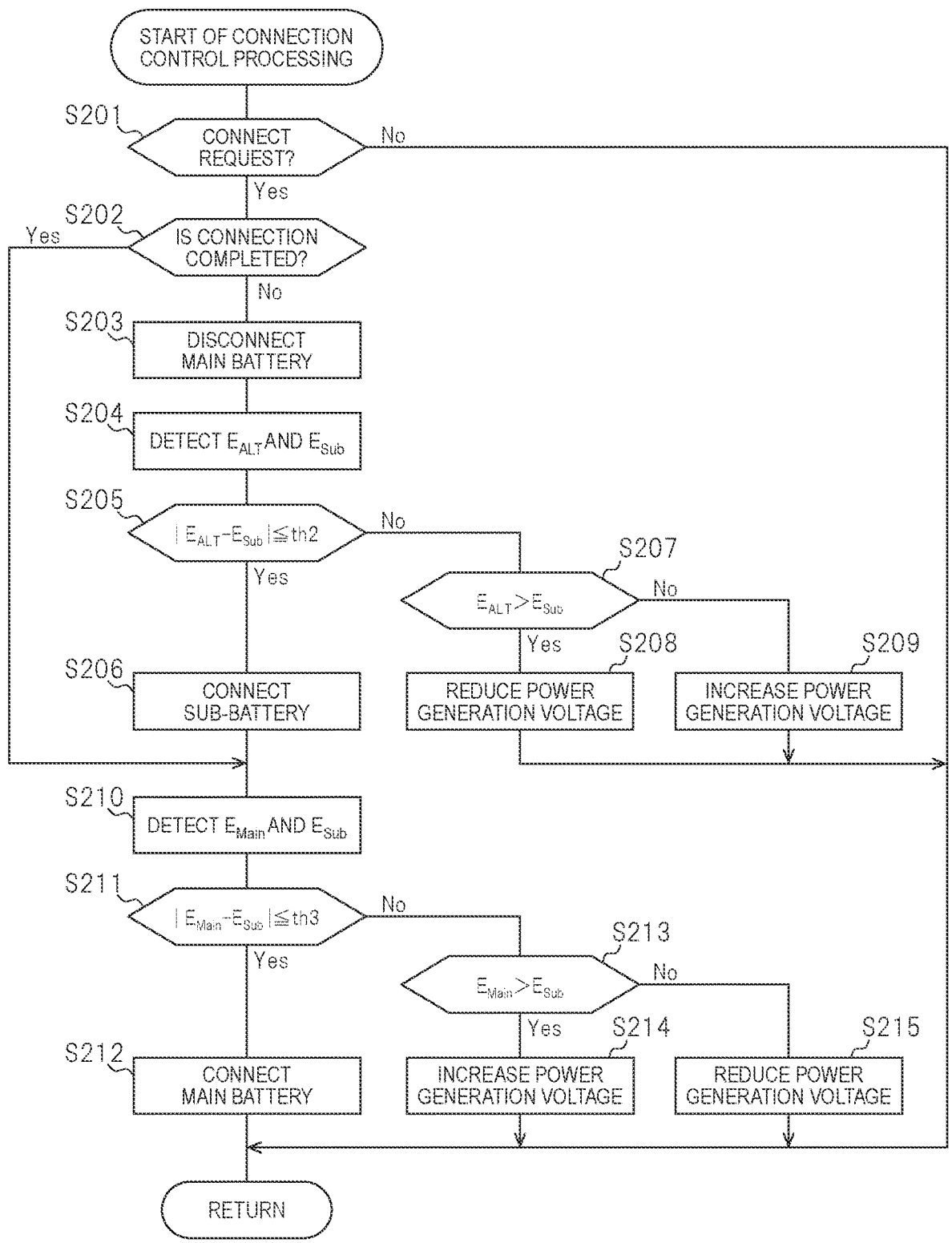
FIG. 9 is a flowchart illustrating connection control processing according to one or more embodiments of the present invention.

FIG. 9 is a flowchart illustrating connection control processing in one or more embodiments of the present invention.

In step S201, it is determined whether a request to connect the sub-battery 33 to the power supply circuit 31 has been issued. If a connect request has been issued, the process proceeds to step S202. If no connect request has been issued, the process directly returns to a predetermined main program.

In step S202, it is determined whether the sub-battery 33 has already been connected to the power supply circuit 31. If the sub-battery 33 has not yet been connected to the power supply circuit 31, the process proceeds to step S203. If the sub-battery 33 has already been connected to the power supply circuit 31, the process proceeds to step S210.

In step S203, the relay 35 is opened to disconnect the main battery 32 from the power supply circuit 31.

In step S204, the power generation voltage $E_{ALT}$ of the alternator 24 and the voltage $E_{Sub}$ of the sub-battery 33 are respectively detected via predetermined voltage detector circuits.

In step S205, it is determined whether the absolute value ($|E_{ALT}-E_{Sub}|$) of the difference between the power generation voltage $E_{ALT}$ and the voltage $E_{Sub}$ is equal to or smaller than a predefined set value th2. The set value th2 may be equal to, or different from, th1. If the determination result is $|E_{ALT}-E_{Sub}|\leq$th2, it is determined that the sub-battery 33 can be connected to the power supply circuit 31, and the process proceeds to step S206. If the determination result is $|E_{ALT}-E_{Sub}|>$th2, it is determined that the sub-battery 33 still cannot be connected to the power supply circuit 31, and the process proceeds to step S207.

In step S206, the relay 34 is closed to connect the sub-battery 33 to the power supply circuit 31, and the process proceeds to step S210.

In step S207, it is determined whether the power generation voltage $E_{ALT}$ is higher than the voltage $E_{Sub}$. If the determination result is $E_{ALT}>E_{Sub}$, it is determined that the power generation voltage $E_{ALT}$ of the alternator 24 needs to be reduced, and the process proceeds to step S208. If the determination result is $E_{ALT}<E_{Sub}$, it is determined that the power generation voltage $E_{ALT}$ of the alternator 24 needs to be increased, and the process proceeds to step S209.

In step S208, voltage change control is performed to reduce the power generation voltage $E_{ALT}$ of the alternator 24, and the process returns to the predetermined main program.

In step S209, voltage change control is performed to increase the power generation voltage $E_{ALT}$ of the alternator 24, and the process returns to the predetermined main program.

In step S210, the voltage $E_{Main}$ of the main battery 32 and the voltage $E_{Sub}$ of the sub-battery 33 are respectively detected via predetermined voltage detector circuits.

In step S211, it is determined whether the absolute value ($|E_{Main}-E_{Sub}|$) of the difference between the voltages $E_{Main}$ and $E_{Sub}$ is equal to or smaller than a predefined set value th3. The set value th3 may be equal to, or different from, th1. If the determination result is $|E_{Main}-E_{Sub}|\leq$th3, it is determined that the main battery 32 can be connected to the power supply circuit 31, and the process proceeds to step S212. If the determination result is $|E_{Main}-E_{Sub}|>$th3, it is determined that the main battery 32 still cannot be connected to the power supply circuit 31, and the process proceeds to step S213.

In step S212, the relay 35 is closed to connect the main battery 32 to the power supply circuit 31, and the process returns to the predetermined main program.

In step S213, it is determined whether the voltage $E_{Main}$ is higher than the voltage $E_{Sub}$. If the determination result is $E_{Main}>E_{Sub}$, it is determined that the voltage $E_{Sub}$ of the sub-battery 33 needs to be increased, and the process proceeds to step S214. If the determination result is $E_{Main}<E_{Sub}$, it is determined that the voltage $E_{Sub}$ of the sub-battery 33 needs to be reduced, and the process proceeds to step S215.

In step S214, voltage change control is performed to increase the power generation voltage $E_{ALT}$ of the alternator 24, and the process returns to the predetermined main program.

In step S215, voltage change control is performed to reduce the power generation voltage $E_{ALT}$ of the alternator 24, and the process returns to the predetermined main program.

Connection control processing has been described above.

<<Actions>>

The actions of one or more embodiments of the present invention will be described below.

When a request to connect the sub-battery 33 has been issued ("Yes" is determined in step S201), the main battery 32 is disconnected from the power supply circuit 31 first (step S203). The power generation voltage $E_{ALT}$ of the alternator 24 is equalized with the voltage $E_{Sub}$ of the sub-battery 33, that is, the potential difference is reduced to a given tolerance, and the sub-battery 33 is then connected. In other words, when the difference ($|E_{ALT}-E_{Sub}|$) between the power generation voltage $E_{ALT}$ and the voltage $E_{Sub}$ is larger than the set value th2 ("No" is determined in step S205), the power generation voltage $E_{ALT}$ of the alternator 24 is controlled in accordance with an inequality between these voltages.

When the power generation voltage $E_{ALT}$ of the alternator 24 is higher than the voltage $E_{Sub}$ of the sub-battery 33 ("Yes" is determined in step S207), the power generation voltage $E_{ALT}$ of the alternator 24 is reduced (step S208). Thus, the power generation voltage $E_{ALT}$ can be reduced and brought close to the voltage $E_{Sub}$ of the sub-battery 33. When the difference ($|E_{ALT}-E_{Sub}|$) between the power generation voltage $E_{ALT}$ and the voltage $E_{Sub}$ becomes equal to or smaller than the set value th2 ("Yes" is determined in step S205), the sub-battery 33 is connected to the power supply circuit 31 (step S206).

The voltage $E_{Main}$ of the main battery 32 is equalized with the voltage $E_{Sub}$ of the sub-battery 33, that is, the potential difference is reduced to a given tolerance, and the main battery 32 is then connected. In other words, when the difference ($E_{Main}-E_{Sub}$) between the voltages $E_{Main}$ and $E_{Sub}$ is larger than the set value th3 ("No" is determined in step S211), the power generation voltage $E_{ALT}$ of the alternator 24 is controlled in accordance with an inequality between these voltages.

When the voltage $E_{Main}$ of the main battery 32 is higher than the voltage $E_{Sub}$ of the sub-battery 33 ("Yes" is determined in step S213), the power generation voltage $E_{ALT}$ of the alternator 24 is increased (step S214). In this manner, increasing the power generation voltage $E_{ALT}$, in turn, can increase and bring the voltage $E_{Sub}$ of the sub-battery 33 close to the voltage $E_{Main}$ of the main battery 32. When the difference ($E_{Main}-E_{Sub}$) between the voltages $E_{Main}$ and $E_{Sub}$ becomes equal to or smaller than the set value th3 ("Yes" is determined in step S211), the main battery 32 is connected to the power supply circuit 31 (step S212).

Figure 10:
FIG. 10 is a timing chart illustrating operation example 2-1.
Figure 10:
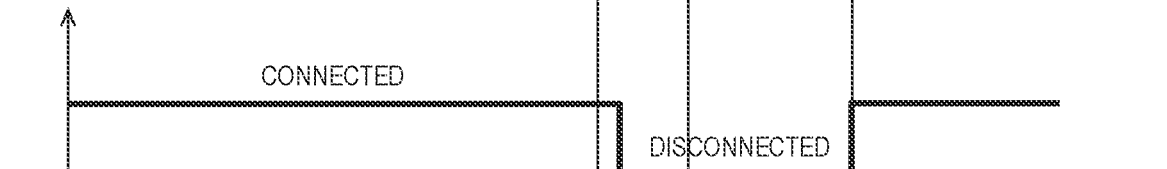
Figure 10:
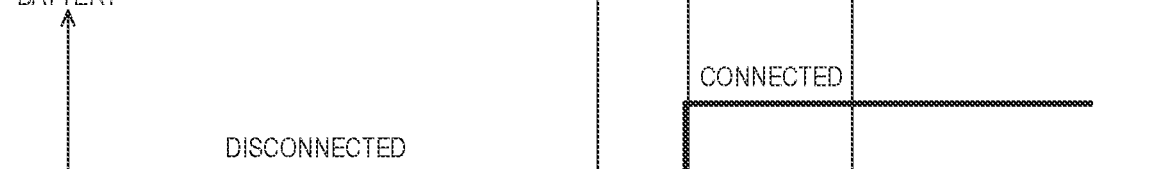
Figure 10:
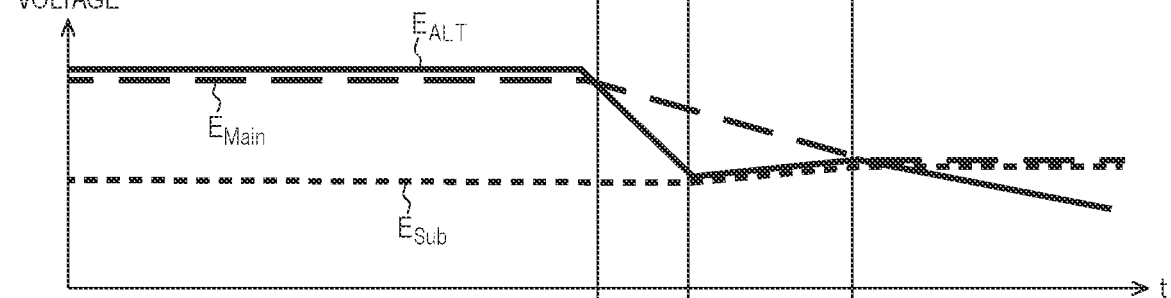
Figure 10:
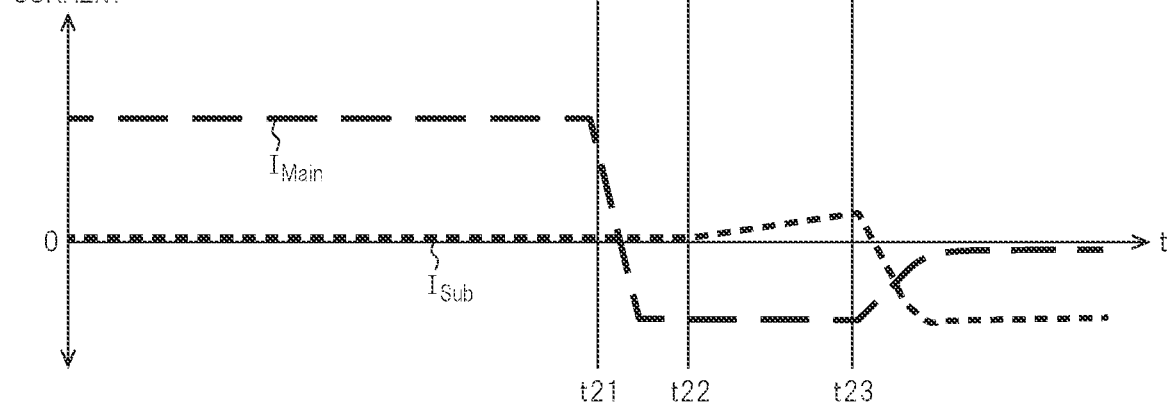

FIG. 10 is a timing chart illustrating operation example 2-1.

FIG. 10 represents the presence or absence of a connect request, the connection or disconnection state of the main battery 32, and the connection or disconnection state, the voltage, and the current of the sub-battery 33 on the time axis. For the voltage, the power generation voltage $E_{ALT}$ of the alternator 24 is indicated by a solid line, the voltage $E_{Main}$ of the main battery 32 is indicated by a broken line, and the voltage $E_{Sub}$ of the sub-battery 33 is indicated by a dotted line. For the current, the current $I_{Main}$ of the main battery 32 is indicated by a broken line and the current $I_{Sub}$ of the sub-battery 33 is indicated by a dotted line. The voltage $E_{Main}$ of the main battery 32 is nearly equal to the voltage $E_{CKT}$ of the power supply circuit 31.

At time instant t21, a request to connect the sub-battery 33 is issued. At this time, the voltage $E_{Main}$ ($E_{ALT}$) of the main battery 32 is higher than the voltage $E_{Sub}$ of the sub-battery 33 and their potential difference is larger than the set value th2. Hence, the main battery 32 is disconnected from the power supply circuit 31 via the relay 35 first. Since no power is then supplied from the alternator 24 to the main battery 32 and the electrical equipment load 26 consumes power, the voltage $E_{Main}$ of the main battery 32 gradually drops. The power generation voltage $E_{ALT}$ of the alternator 24 is reduced and brought close to the voltage $E_{Sub}$ of the sub-battery 33.

At time instant t22, the potential difference between the alternator 24 and the sub-battery 33 becomes equal to or smaller than the set value th2. Hence, the sub-battery 33 is connected to the power supply circuit 31 via the relay 34. In this case, besides, since the main battery 32 is disconnected, the current $I_{Sub}$ of the sub-battery 33 does not rapidly increase. The voltage $E_{Main}$ of the main battery 32 is still higher than the voltage $E_{Sub}$ of the sub-battery 33 and their potential difference is larger than the set value th3. Hence, the power generation voltage $E_{ALT}$ of the alternator 24 is increased to, in turn, increase and bring the voltage $E_{Sub}$ of the sub-battery 33 close to the voltage $E_{Main}$ of the main battery 32.

At time instant t23, the potential difference between the main battery 32 and the sub-battery 33 becomes equal to or smaller than the set value th3. Hence, the main battery 32 is connected to the power supply circuit 31 via the relay 35. In this case, since the current $I_{Main}$ of the main battery 32 does not rapidly increase, the flow of an abrupt high current through the main battery 32 can be suppressed. An abrupt change in current $I_{Sub}$ of the sub-battery 33 can also be suppressed.

When the power generation voltage $E_{ALT}$ of the alternator 24 is lower than the voltage $E_{Sub}$ of the sub-battery 33 ("No" is determined in step S207), the power generation voltage $E_{ALT}$ of the alternator 24 is increased (step S209). Hence, the power generation voltage $E_{ALT}$ can be increased and brought close to the voltage $E_{Sub}$ of the sub-battery 33. When the difference ($|E_{ALT}-E_{Sub}|$) between the power generation voltage $E_{ALT}$ and the voltage $E_{Sub}$ becomes equal to or smaller than the set value th2 ("Yes" is determined in step S205), the sub-battery 33 is connected to the power supply circuit 31 (step S206).

When the voltage $E_{Main}$ of the main battery 32 is lower than the voltage $E_{Sub}$ of the sub-battery 33 ("No" is determined in step S213), the power generation voltage $E_{ALT}$ of the alternator 24 is reduced (step S215). In this manner, reducing the power generation voltage $E_{ALT}$, in turn, can reduce and bring the voltage $E_{Sub}$ of the sub-battery 33 close to the voltage $E_{Main}$ of the main battery 32. When the difference ($|E_{Main}-E_{Sub}|$) between the voltages $E_{Main}$ and $E_{Sub}$ becomes equal to or smaller than the set value th3 ("Yes" is determined in step S211), the main battery 32 is connected to the power supply circuit 31 (step S212).

Figure 11:
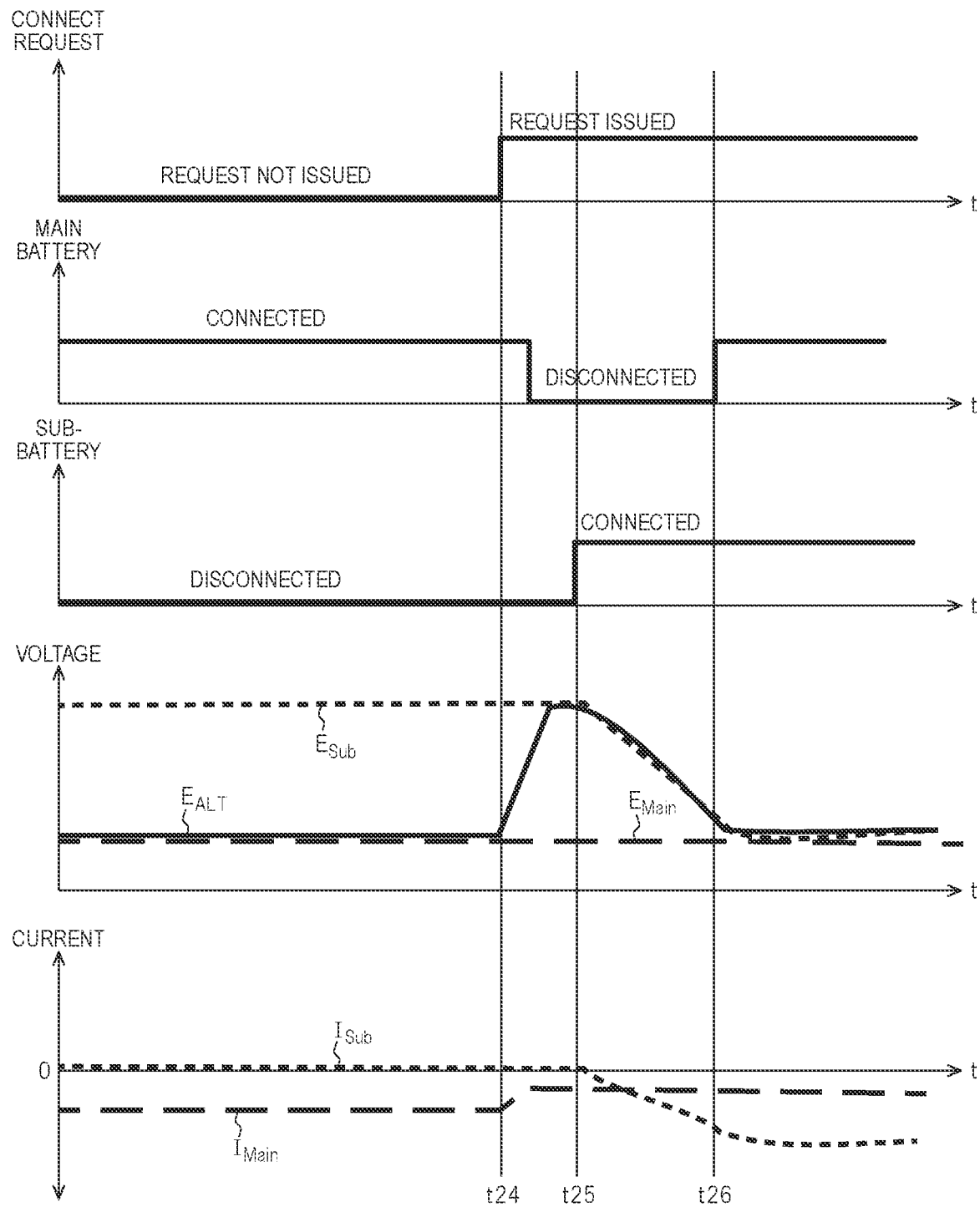
FIG. 11 is a timing chart illustrating operation example 2-2.

FIG. 11 is a timing chart illustrating operation example 2-2.

FIG. 11 represents the presence or absence of a connect request, the connection or disconnection state of the main battery 32, and the connection or disconnection state, the voltage, and the current of the sub-battery 33 on the time axis. For the voltage, the power generation voltage $E_{ALT}$ of the alternator 24 is indicated by a solid line, the voltage $E_{Main}$ of the main battery 32 is indicated by a broken line, and the voltage $E_{Sub}$ of the sub-battery 33 is indicated by a dotted line. For the current, the current $I_{Main}$ of the main battery 32 is indicated by a broken line and the current $I_{Sub}$ of the sub-battery 33 is indicated by a dotted line. The voltage $E_{Main}$ of the main battery 32 is nearly equal to the voltage $E_{CKT}$ of the power supply circuit 31.

At time instant t24, a request to connect the sub-battery 33 is issued. At this time, the voltage $E_{Main}$ ($\approx E_{ALT}$) of the main battery 32 is lower than the voltage $E_{Sub}$ of the sub-battery 33 and their potential difference is larger than the set value th2. Hence, the main battery 32 is disconnected from the power supply circuit 31 via the relay 35 first. The power generation voltage $E_{ALT}$ of the alternator 24 is increased and brought close to the voltage $E_{Sub}$ of the sub-battery 33. In this case, since the alternator 24 is connected to neither the main battery 32 nor the sub-battery 33, unnecessary charging is avoided.

At time instant t25, the potential difference between the alternator 24 and the sub-battery 33 becomes equal to or smaller than the set value th2. Hence, the sub-battery 33 is connected to the power supply circuit 31 via the relay 34. In this case, the current $I_{Sub}$ of the sub-battery 33 does not rapidly increase. The voltage $E_{Main}$ of the main battery 32 is still lower than the voltage $E_{Sub}$ of the sub-battery 33 and their potential difference is larger than the set value th3. Hence, the power generation voltage $E_{ALT}$ of the alternator 24 is reduced to, in turn, reduce and bring the voltage $E_{Sub}$ of the sub-battery 33 close to the voltage $E_{Main}$ of the main battery 32. In this case, since the power generation voltage $E_{ALT}$ of the alternator 24 is set slightly lower than the voltage $E_{Sub}$ of the sub-battery 33, the sub-battery 33 is not unnecessarily charged.

At time instant t26, the potential difference between the main battery 32 and the sub-battery 33 becomes equal to or smaller than the set value th3. Hence, the main battery 32 is connected to the power supply circuit 31 via the relay 35. In this case, since the current $I_{Main}$ of the main battery 32 does not rapidly increase, the flow of an abrupt high current through the main battery 32 can be suppressed. An abrupt change in current $I_{Sub}$ of the sub-battery 33 can also be suppressed.

As described above, upon disconnection of the main battery 32 from the power supply circuit 31, as the power generation voltage $E_{ALT}$ is adjusted to the voltage $E_{Sub}$, the voltage $E_{Sub}$ is further adjusted to the voltage $E_{Main}$, and the main battery 32 is then connected, the flow of an abrupt high current can be suppressed.

The use of the relay 35 to select whether the main battery 32 is to be connected to or disconnected from the power supply circuit 31 allows easy, reliable switching between connection and disconnection of the main battery 32.

Application Examples

The main battery 32 is disconnected from the power supply circuit 31 after a request to connect the sub-battery 33 is issued in one or more embodiments of the present invention, but the timing to disconnect the main battery 32 may be controlled. For example, when the voltage $E_{Main}$ of the main battery 32 is higher than the voltage $E_{Sub}$ of the sub-battery 33, the power generation voltage $E_{ALT}$ of the alternator 24 starts to be reduced first, and after the current $I_{Main}$ of the main battery 32 reaches the neighborhood of zero, the main battery 32 is disconnected. When the voltage $E_{Main}$ of the main battery 32 is lower than the voltage $E_{Sub}$ of the sub-battery 33, the power generation voltage $E_{ALT}$ of the alternator 24 starts to be increased first, and after the current $I_{Main}$ of the main battery 32 reaches the neighborhood of zero, the main battery 32 is disconnected. In this manner, controlling the timing to disconnect the main battery 32 from the power supply circuit 31 can suppress the load on the relay 35.

<<Correspondences>>

The relay 35 corresponds to a "switch for the main battery." Steps S201 to S215 correspond to a "connection control unit."

One or more effects that may be achieved by one or more embodiments of the present invention will be described below.

(1) In a vehicle power supply control method according to one or more embodiments of the present invention, when the main battery 32 can be disconnected from the power supply circuit 31, the main battery 32 is disconnected from the power supply circuit 31 first. The sub-battery 33 is connected to the power supply circuit 31 after the power generation voltage of the alternator 24 is adjusted to the voltage of the sub-battery 33 by controlling this power generation voltage. The main battery 32 is connected to the power supply circuit 31 after the voltage of the sub-battery 33 is adjusted to that of the main battery 32 by controlling the power generation voltage of the alternator 24.

In this manner, since the main battery 32 is connected to the power supply circuit 31 to which the sub-battery 33 is connected after the voltage of the sub-battery 33 is adjusted to that of the main battery 32, the flow of an abrupt high current can be suppressed.

(2) In the vehicle power supply control method according to one or more embodiments of the present invention, the relay 35 is used to select whether the main battery 32 and the electrical equipment load 26 are to be connected to or disconnected from the power supply circuit 31.

In this manner, connection or disconnection of the main battery 32 and the electrical equipment load 26 via the relay 35 allows easy, reliable switching between such connection and disconnection.

While the present invention has been described above with reference to only a limited number of embodiments, the scope of claims is not limited thereto, and modifications to the embodiments based on the aforementioned disclosure will be apparent to those skilled in the art. Each embodiment can be used in any combination.

REFERENCE SIGNS LIST

11 . . . controller
21 . . . engine
22 . . . starter motor
24 . . . alternator
25 . . . electrical equipment load
26 . . . electrical equipment load
31 . . . power supply circuit
32 . . . main battery
33 . . . sub-battery
34 . . . relay
35 . . . relay

The invention claimed is:

1. A vehicle power supply control method for connecting a sub-battery to a power supply circuit that is connected to a main battery, the method comprising:
upon determining that a request to connect the sub-battery to the power supply circuit is issued and determining that the sub-battery is not connected to the power supply circuit, disconnecting the main battery from the power supply circuit, detecting a voltage of an alternator, a voltage of the sub-battery, and a voltage of the disconnected main battery, determining if a first absolute value of the voltage of the alternator minus the voltage of the sub-battery is equal to or smaller than a first threshold,
upon determining that the first absolute value is equal to or smaller than the first threshold, connecting the sub-battery to the power supply circuit; and
upon determining that the first absolute value is higher than the first threshold, adjusting the voltage of the alternator, determining if a second absolute value of the voltage of the disconnected main battery minus the voltage of the sub-battery is equal to or smaller than a second threshold, upon determining that the second absolute value is equal to or smaller than the second threshold, connecting the disconnected main battery back to the power supply circuit; and
upon determining that the second absolute value is higher than the second threshold, adjusting the voltage of the sub-battery by controlling the voltage of the alternator, wherein the sub-battery has an internal resistance lower than an internal resistance of the main battery.

2. The vehicle power supply control method according to claim 1, wherein a switch for the main battery is used to select whether the main battery is to be connected to the power supply circuit or disconnected from the power supply circuit.

3. The vehicle power supply control method according to claim 1, wherein a switch for the sub-battery is used to select whether the sub-battery is to be connected to the power supply circuit or disconnected from the power supply circuit.

4. The vehicle power supply control method according to claim 2, wherein a switch for the sub-battery is used to select whether the sub-battery is to be connected to the power supply circuit or disconnected from the power supply circuit.

5. A vehicle power supply control device for controlling connections to a power supply circuit, the control device comprising:
a main battery;
a sub-battery;
wherein the sub-battery has an internal resistance lower than an internal resistance of the main battery, and
a connection controller configured to:
upon determining that a request to connect the sub-battery to the power supply circuit is issued and determining that the sub-battery is not connected to the power supply circuit, disconnect the main battery from the power supply circuit,
detect a voltage of an alternator, a voltage of the sub-battery, and a voltage of the disconnected main battery,
determine if a first absolute value of the voltage of the alternator minus the voltage of the sub-battery is equal to or smaller than a first threshold,
upon determining that the first absolute value is equal to or smaller than the first threshold, connect the sub-battery to the power supply circuit; and
upon determining that the first absolute value is higher than the first threshold, adjust the voltage of the alternator,
determining if a second absolute value of the voltage of the disconnected main battery minus the voltage of the sub-battery is equal to or smaller than a second threshold,
upon determining that the second absolute value is equal to or smaller than the second threshold, connect the disconnected main battery back to the power supply circuit; and
upon determining that the second absolute value is higher than the second threshold, adjust the voltage of the sub-battery by controlling the voltage of the alternator.

* * * * *